United States Patent [19]

Brugere et al.

[11] 4,349,453

[45] Sep. 14, 1982

[54] METHOD FOR PROCESSING ALKALINE SOLUTIONS CONTAINING RADIOACTIVE IODINE DURING REPROCESSING OF NUCLEAR FUELS

[75] Inventors: Christiane Brugère, Paris; Jean-Pierre Goumondy, Vitry; Jean-Marie Morel, Massy; Edmond Zellner, Gif-sur-Yvette, all of France

[73] Assignee: Commissariat a l'Energie Atomique, Paris, France

[21] Appl. No.: 101,546

[22] Filed: Dec. 10, 1979

[30] Foreign Application Priority Data

Dec. 20, 1978 [FR] France ............................ 78 35829

[51] Int. Cl.³ .......................... G21C 19/46; G21F 9/02
[52] U.S. Cl. ................................... 252/627; 423/235; 423/241; 252/630
[58] Field of Search ............... 423/2, 249, 240 R, 241, 423/235, 351; 252/301.1 W

[56] References Cited

U.S. PATENT DOCUMENTS 3,752,876 8/1973 Cathers ........................ 423/240 R

FOREIGN PATENT DOCUMENTS 1498080 1/1978 United Kingdom .

*Primary Examiner*—Deborah L. Kyle
*Attorney, Agent, or Firm*—Pearne, Gordon, Sessions, McCoy & Granger

[57] ABSTRACT

The method of processing alkaline solutions containing radioactive iodine consists in dissolving irradiated fuels in a nitric acid solution. The vapors constituted essentially by nitrogen oxides, iodine and water formed during dissolution are passed into a condenser and then into a first absorption column in which the recombined nitric acid is formed. The recombined acid is returned to the dissolver while the gases discharged from the first absorption column are passed into a second absorption column in counterflow to an alkaline solution which is loaded with iodine and with nitrous ions. The alkaline solution discharged from the second absorption column is passed into a reaction vessel containing a mixture of nitric acid and sulphamic acid which destroys the nitrous products and releases the iodine.

3 Claims, 1 Drawing Figure

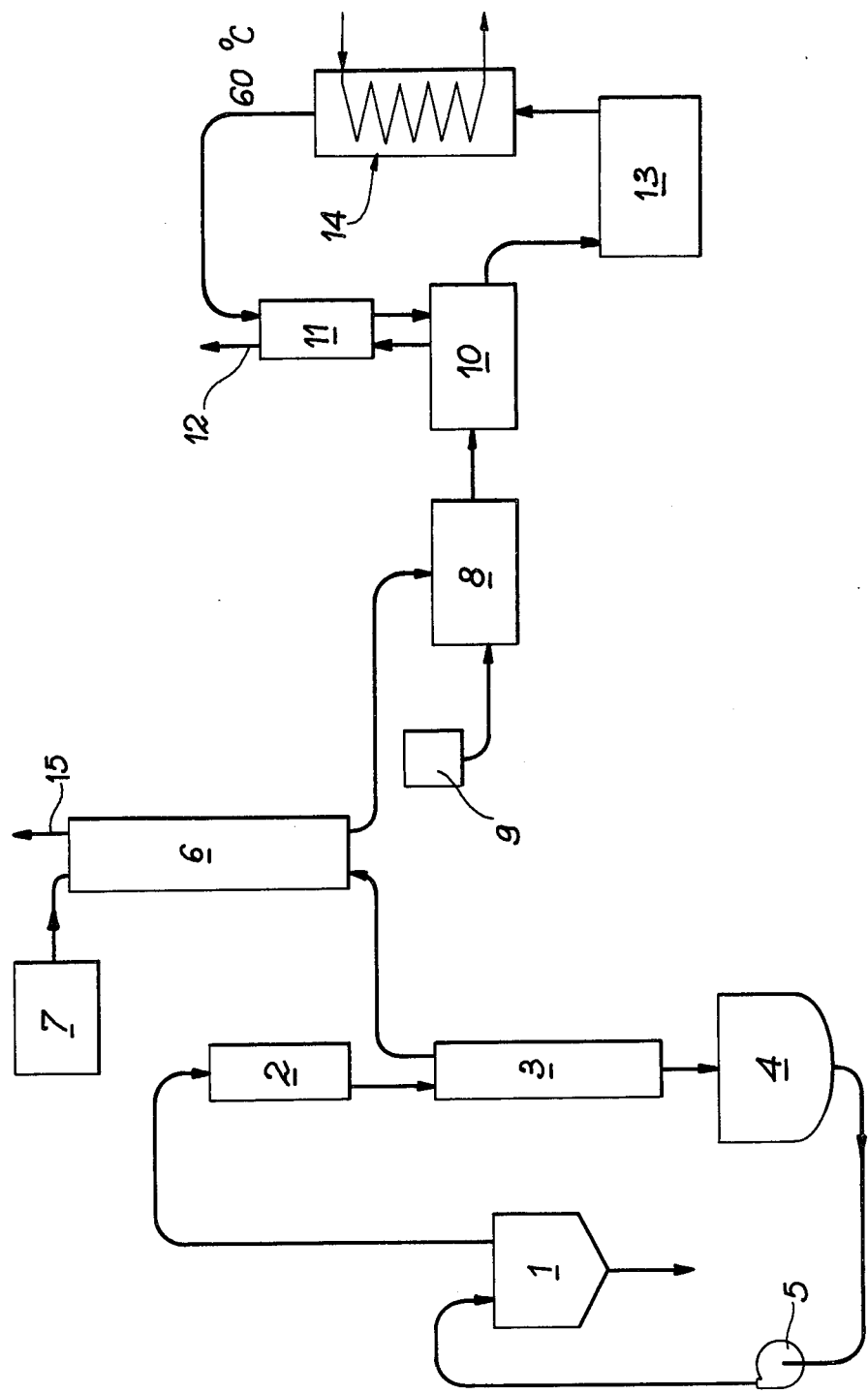

METHOD FOR PROCESSING ALKALINE SOLUTIONS CONTAINING RADIOACTIVE IODINE DURING REPROCESSING OF NUCLEAR FUELS

This invention relates to a method for processing alkaline solutions containing radioactive iodine during reprocessing of nuclear fuels.

It is known that radioactive iodine is formed during irradiation of fuel in nuclear reactors and that the greater part of the iodine is trapped within the fuel elements. At the moment of shearing of the fuel can at the beginning of the fuel-reprocessing operation, only about 10% of the iodine escapes and the remainder is released only during dissolution of fuel in a nitric acid medium.

Since radioactive iodine is a contaminant and is produced in quantities which steadily increase with the number of nuclear reactors in service, several attempts have already been made to recover said iodine under the best possible conditions.

Among the known methods already employed for this purpose, mention can be made of the method described in French Pat. No. 2,277,415 filed on July 3, 1974 and entitled "Method of extraction, trapping and storage of radioactive iodine contained in irradiated nuclear fuels". In this method, the irradiated fuels are dissolved in a nitric acid solution, the vapors consisting essentially of water, nitrogen oxide and iodine and formed during dissolution are passed into a condenser, then into a first absorption column in which is formed recombined nitric acid containing nitrous ions and iodine, the recombined acid is passed into a desorption column in counterflow to a carrier gas which is loaded with iodine. Said iodine-loaded gas is passed into a second absorption column in counterflow to an alkaline solution to which a reducing agent may or may not be added, whereupon the alkaline solution discharged from the second absorption column receives an addition of a copper or lead salt which precipitates the iodine in the form of iodide.

In the case of precipitation of iodine in the form of lead iodide, this method is subject to a disadvantage which lies in the fact that the iodine discharge from the second absorption column is not completely freed from the nitrous ions. In a reducing medium and during precipitation of the lead iodide, said nitrous ions are liable to combined with the lead and thus produce lead nitride which is an unstable compound and presents an explosion hazard.

The present invention makes it possible to overcome this disadvantage by providing a method for removing the nitrous ions which accompany the iodine in the alkaline solution discharged from the second absorption column.

The invention is directed to a method for processing alkaline solutions containing radioactive iodine during reprocessing of nuclear fuels in which the irradiated fuels are dissolved in a nitric acid solution, the vapors constituted essentially by nitrogen oxides, iodine and water formed during dissolution are passed into a condenser and then into a first absorption column in which the recombined nitric acid is formed. The method is distinguished by the fact that the recombined acid is returned to the dissolver whilst the gases discharged from said absorption column are passed into a second absorption column in a counterflow to an alkaline solution which is loaded with iodine and with nitrous ions. A further distinctive feature lies in the fact that the alkaline solution discharged from the second absorption column is passed into a reaction vessel containing a mixture of nitric acid and sulphamic acid which destroys the nitrous products and releases the iodine.

In accordance with a known method, the iodine can then be separated-out in complete safety in the form of lead iodide.

Further advantages and characteristic features of the invention will in any case become apparent from the following description of one exemplified embodiment which is given by way of illustration and not in any limiting sense, reference being made to the accompanying drawings in which the FIGURE is a schematic presentation of the different stages of the method.

Two tons of irradiated fuels containing radioactive iodine are dissolved within a vessel 1. The vapors formed and consisting essentially of nitrogen oxides, iodine and water are passed into a condenser 2 in which a fraction of the iodine is removed as a dissolved component of the water condensate, then into a first absorption column 3. Recombined acid is formed in said column and collected in a vessel 4 before being returned to the dissolver by means of a pump 5. The gases discharged from the first absorption column are passed into a second absorption column 6 in couterflow to an alkaline solution supplied from a tank 7. The gases discharged from the column 6 at 15 can be recycled to the head of the dissolver or directed to silver traps. The quantity of alkaline solution which leaves the column 6 and has been loaded both with iodine and with nitrous ions is approximately 1000 liters and contains:

| | |
|---|---|
| NaOH | 0.4M |
| NaNO$_3$ | 0.45M |
| NaNO$_2$ | 0.45M |
| NaI | 4.25 × 10$^{-3}$M |

This solution is passed at a low rate of flow over a period of approximately 1 hour into a reactor 8 containing 250 l of a 2 M sulphamic and nitric acid solution, the temperature of which is brought to a value between 50° and 70° C.

The concentrations of HNO$_3$ are 5.5 M at 50° C. and 2.4 at 70° C.

The sulphamic acid performs a function both of destruction of nitrous products and oxidation of the iodine according to the reactions:

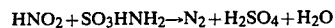

$$HNO_2 + SO_3HNH_2 \rightarrow N_2 + H_2SO_4 + H_2O$$

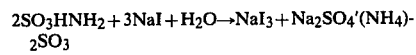

$$2SO_3HNH_2 + 3NaI + H_2O \rightarrow NaI_3 + Na_2SO_4'(NH_4)_2SO_3$$

It can be noted that desorption of the iodine contained in NaI$_3$ which can be written NaI, I$_2$ is assisted by the presence of nitric acid. In order to ensure destruction of the nitrous products, it must be ensured that the ratio [SO$_3$HNH$_2$]/[NO$_2$](entering) is either higher than or equal to 1. When the temperature of the reaction vessel is 50° C., it must further be ensured that the initial concentration of HNO$_3$ is equal to 5.5 M and this initial concentration of HNO$_3$ must be equal to 2.4 M when the temperature is 70° C.

In order to serve as carrier gas for the released iodine, a gas (such as air, for example) is injected into the bottom of the reaction vessel by means of a pump 9. The gas flow rate is maintained at 100 m³ per hour after the end of injection of the alkaline solution until the presence of iodine within the reaction vessel 8 is no longer detectable. The desorption operation requires 1 to 2 hours after injection of the alkaline solution has been stopped. The greater part of the iodine is entrained in the form of elementary iodine within the reaction vessel 10 in which it is precipitated in the form of lead iodide.

After removal of the iodine from the reaction vessel 8 which contains 1250 l of solution, the concentration of the remaining iodine is lower than $10^{-6}$ M, the concentration of Na+ is 1.04 M and the concentration of $SO_4^{--}$ is 0.4 M.

The carrier gas which entrains the iodine is admitted into a reaction vessel 10 above which is mounted a scrubbing column 11 in which the upflowing gas is sprayed with a solution consisting of a mixture of $10^{-2}$ M lead nitrate and $2 \times 10^{-2}$ M hydrazine nitrate. Satisfactory precipitation takes place when the ratio $[Pb^{++}]/[2I^-]$ is higher than or equal to 2, when the concentration of hydrazine nitrate is of the order of $2.10^{-2}$ M and when the pH value is between 3 and 1. The assembly consisting of reaction vessel and column must be maintained at 60° C. The gases discharged from the column 11 at 12 can be recycled to the head of the dissolver or directed to silver traps.

The solution which leaves the reaction vessel is cooled to a value between 15° and 20° C. in order to obtain precipitation of lead iodide and is then passed into a settler 13 which is in turn cooled to a value between 15° and 20° C. The precipitate settles rapidly and can be collected at the bottom of the settler 13. The supernatant solution is filtered, reheated to 60° C. within the reheater 14 and readjusted by means of lead oxide and hydrazine before being passed to the head of the gas-scrubbing column 11. The lead iodide is recovered in the solid state and conditioned in known manner.

What is claimed is:

1. A method for processing alkaline solutions containing radioactive iodine released during reprocessing of nuclear fuels in which irradiated fuels are dissolved in a nitric acid solution, the vapors constituted essentially by nitrogen oxides, iodine and water formed during dissolution are passed into a condenser and then into a first absorption column in which recombined nitric acid is formed, wherein the recombined acid is returned to the dissolved whilst the gases discharged from said first absorption column are passed into a second absorption column in counterflow to an alkaline solution which picks up iodine and nitrous ions from such gases, and wherein the alkaline solution discharged from the second absorption column is passed into a reaction vessel containing a mixture of nitric acid and sulphamic acid which destroys the nitrous products and releases the iodine.

2. A method according to claim 1, wherein the ratio of concentrations between the sulphamic acid and the entering nitrous ions is maintained within the reaction vessel at a value at least equal to 1.

3. A method according to claim 1, wherein the temperature of the reaction vessel is adjusted to a value between 50° and 70° C. and the initial concentrations of nitric acid are within the range of 5.5 M to 2.4 M.

* * * * *